United States Patent
De Souza

(10) Patent No.: US 7,574,565 B2
(45) Date of Patent: Aug. 11, 2009

(54) TRANSFORMING FLUSH QUEUE COMMAND TO MEMORY BARRIER COMMAND IN DISK DRIVE

(75) Inventor: Jorge Campello De Souza, Cupertino, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 407 days.

(21) Appl. No.: 11/337,724

(22) Filed: Jan. 13, 2006

(65) Prior Publication Data
US 2007/0168626 A1 Jul. 19, 2007

(51) Int. Cl.
G06F 12/00 (2006.01)
G06F 13/00 (2006.01)
G06F 13/28 (2006.01)

(52) U.S. Cl. ............................. 711/135; 711/159
(58) Field of Classification Search ................ 711/159, 711/135
See application file for complete search history.

(56) References Cited

U.S. PATENT DOCUMENTS

| | | | |
|---|---|---|---|
| 5,990,913 A * | 11/1999 | Harriman et al. ............ 345/531 |
| 6,038,646 A | 3/2000 | Sproull ........................ 711/158 |
| 6,378,037 B1 | 4/2002 | Hall ............................. 711/113 |
| 6,609,192 B1 | 8/2003 | Guthrie et al. ............... 712/216 |
| 6,895,482 B1 * | 5/2005 | Blackmon et al. ........... 711/158 |
| 7,353,301 B2 * | 4/2008 | Radhakrishnan et al. ...... 710/33 |
| 2004/0128470 A1 | 7/2004 | Hetzler et al. ............... 711/209 |
| 2005/0080981 A1 | 4/2005 | Archambault et al. .......... 711/1 |

OTHER PUBLICATIONS http://en.wikipedia.org Website print outs for Atomic Transaction, Journaling File System, Log-Structured Filesystems, Metadata, NTFS, Jul. 12, 2004.
Technical Editor Peter T. McLean, Working Draft of Information Technology—AT Attachment with Packet Interface-5 (ATA/ATAPI-5), printed Aug. 31, 1999.
CE-ATA Digital Protocol Revision 1.0 dated Mar. 2, 2005, pp. 1-61.

* cited by examiner

Primary Examiner—Pierre-Michel Bataille
Assistant Examiner—Ralph A Verderamo, III
(74) Attorney, Agent, or Firm—John L. Rogitz

(57) ABSTRACT

In a HDD, the flush queue (cache) command is transformed into a memory barrier command. The HDD thus has an operation mode in which flush commands do not cause the pending commands to be executed immediately, but instead simply introduces a constraint on the command reordering algorithms that prevents commands sent after the flush command from being executed before commands sent prior to the flush command. The constraint may be applied only on write commands.

10 Claims, 4 Drawing Sheets

HDD CONTROLLER SOFTWARE ARCHITECTURE

PRE-PROCESSING

POST-COMMAND SERVICE ROUTINE

US 7,574,565 B2

TRANSFORMING FLUSH QUEUE COMMAND TO MEMORY BARRIER COMMAND IN DISK DRIVE

FIELD OF THE INVENTION

The present invention relates generally to disk drives.

BACKGROUND OF THE INVENTION

In hard disk drives and other storage media, there are many applications that require a certain ordering of commands to be respected. An example of this is a journaling file system. In these systems a set of operations is performed in an atomic manner to guarantee that the file system is always in a consistent state. To do this the file system first writes a record of the operations to be performed, then performs the operations, and at the end writes a confirmation to the journal that the operations were completed. In this way, if the system crashes before the confirmation is written, the system knows it has to redo the operations. The problem here is that the queuing (or write cache) will reorder the commands and therefore may write the confirmation to the journal before all commands are completed.

The current solution to this problem is to flush the queue before sending the update write operation to the HDD. The drawback of this solution is that constant flushing of the queue (and/or the cache) adversely affects performance (throughput). The present invention recognizes the need to address this problem without necessarily requiring a new type of queuing infrastructure that could require a new interface to the HDD and consequently would require the file systems to be rewritten.

Having made this critical observation, the invention disclosed herein is provided.

SUMMARY OF THE INVENTION

A device for storing data includes a data storage medium and a controller controlling the medium and executing logic. The logic includes, in response to a flush command to flush a command queue, not immediately executing pending commands in the queue. The logic constrains a command reordering algorithm to prevent non-flush commands (such as write commands) that are received after the flush command from being executed prior to commands received before the flush command.

The above-summarized constraint may be implemented only if a flag indicates a first binary state, referred to in non-limiting implementations as a "flush active" state. The flag can assume the first binary state in response to a flush command. Also, the flag may assume the opposite (second) binary state when a counter is at zero. The counter can be incremented in response to receiving a write command while the flag is in the second binary state. The counter can be decremented after executing the write command.

In one non-limiting implementation, if the flag is in the first binary state and the counter is at zero, the flag is flipped to the second binary state after servicing a command. If a barrier register is not empty, a next command is executed from the register. If the next command is a flush command, the flag is flipped to the first binary state, and otherwise the command is processed and the counter incremented.

In another aspect, a hard disk drive (HDD) includes means for indicating whether a flush cache feature is active, and means, responsive for the means for indicating, for sending non-flush commands to a command barrier storage.

In still another aspect, a method is disclosed for managing a command queue. In the presence of a flush cache command to flush a cache of a HDD, execution of non-flush cache commands received after the flush cache command is received is temporarily delayed until commands awaiting execution in the cache and received prior to the flush cache command have been executed.

This solution has the advantage of being applicable to current systems that use the flush command to guarantee consistency. Instead of immediately performing all the pending operations, a memory barrier simply is set, guaranteeing that the journal confirmation write operation is performed after all the write commands in the atomic set are performed. But, at the same time it does not require the HDD to immediately perform all the pending commands and therefore does not degrade performance as much as a true flush command. This is particularly true when the memory barrier is imposed only on the write commands. Performance is thus enhanced without the need for changing current systems.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
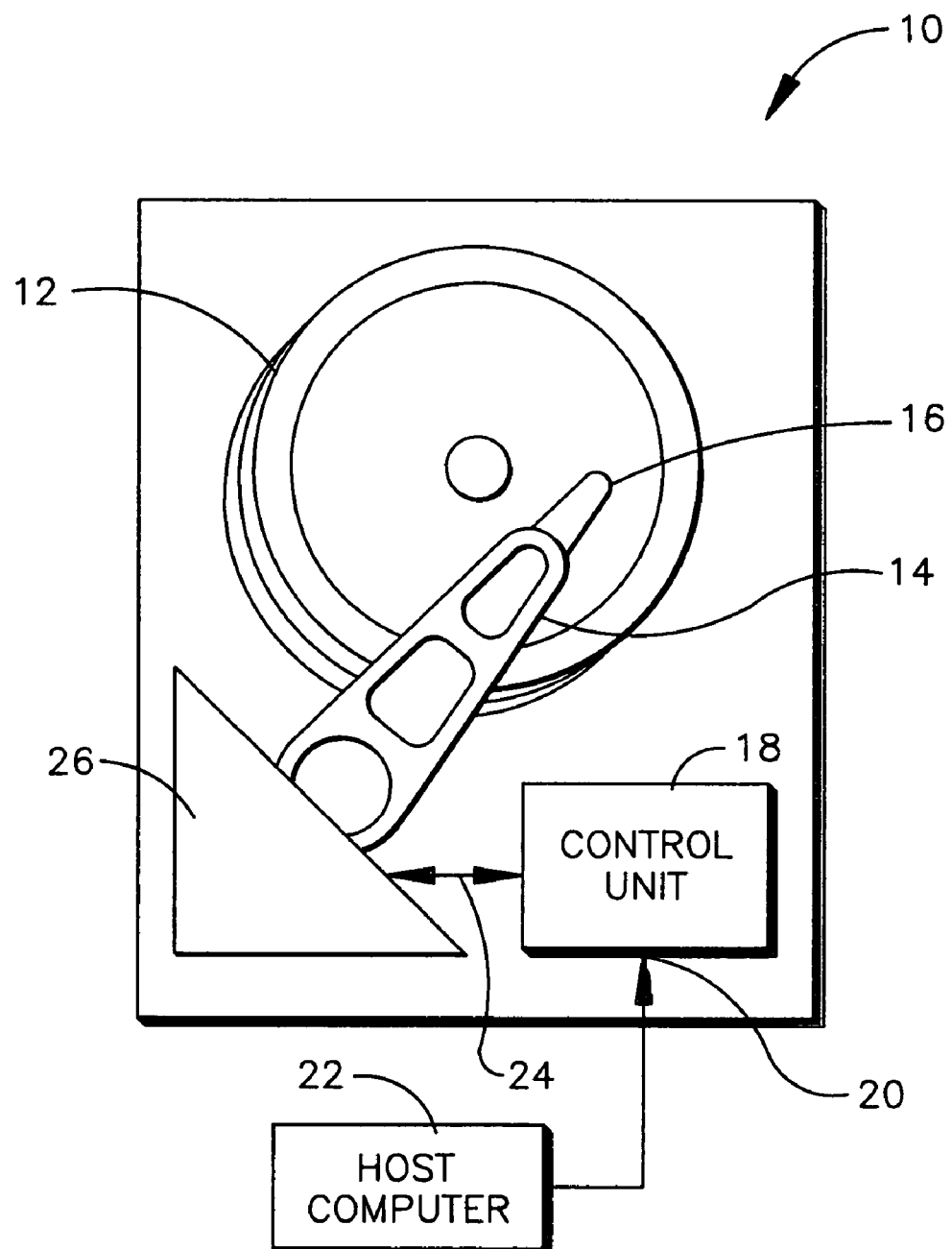
FIG. 1 is a perspective view of an exemplary embodiment of the present storage device, configured as a hard disk drive, with portions of the housing broken away.

Referring initially to FIG. 1, a device is shown, generally designated 10, for storing multimedia and other data on a storage medium 12 that in one embodiment may be implemented by plural storage disks in a hard disk drive. When implemented as a hard disk drive, the device 10 includes an arm 14 having a read/write head 16 on the end thereof in accordance with hard disk drive principles. The data storage region 12 may be managed by a controller 18 that can be a conventional hard disk drive controller modified per the logic below. Or, the controller 18 may be a controller separate from the hard disk drive controller. The controller 18 may be implemented by a chip. The controller and storage disks are sealed in a housing.

The controller 18 may receive input signals at an input/output terminal 20 from a host computer 22. The data input interface may be, in the case of hard disk drive implementations, serial ATA. The input signals may include read and write requests from the host computer 22. A data input and output path 24 which includes servo components 26 is provided between the controller 18 and the storage medium 12.

Figure 2:
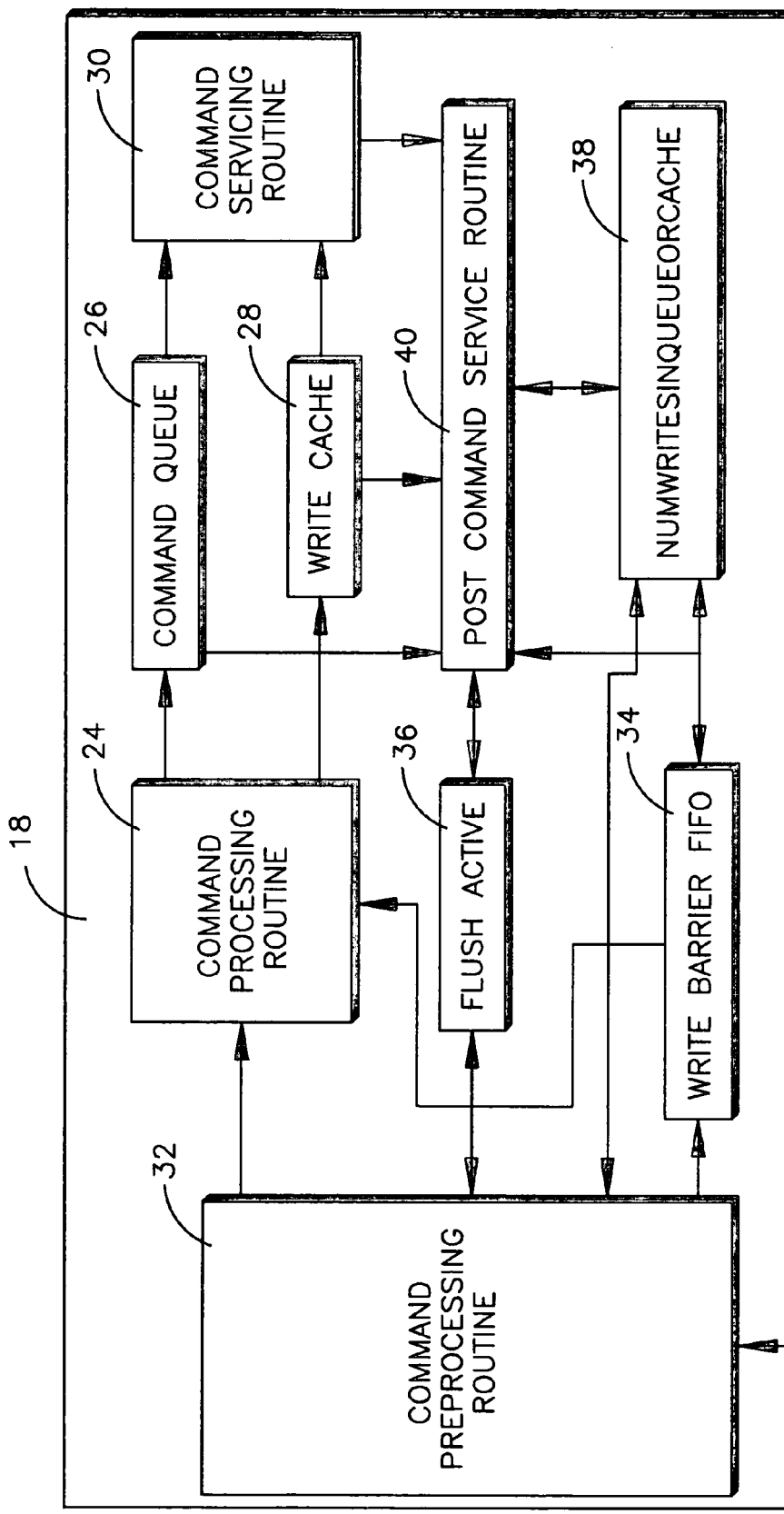
FIG. 2 is a block diagram of non-limiting software architecture used by the controller.

FIG. 2 shows a non-limiting architecture of the controller 18 that can be used to realize the present invention. The controller 18 may include a command processing routine 24 operating on a command queue 26 and a write cache 28 to support a command servicing routine 30 to read and write commands from the host computer 22 to the disks 12 in accordance with HDD principles known in the art. Additionally, in accordance with the non-limiting implementation shown in FIG. 2 and as will become clearer after disclosure of the logic of FIG. 3, a command preprocessing routine 32 may be provided which initially receives commands from the host computer 22 and which communicates the commands to the command processing routine 24. Also, the command preprocessing routine 32 communicates with a barrier storage, which in one non-limiting implementation is a register that can be implemented as a write barrier first-in-first-out (FIFO) 34.

Moreover, the command preprocessing routine 32 can flip the binary state of a flag 36, referred to herein as a "flush active" flag. The preprocessing routine 32 may also increment a counter 38, referred to herein as a "numWritesInQueueOrCache" counter, in accordance with disclosure below. A post command service routine 40, described further in reference to FIG. 4, communicates with the components 26, 28, 30, 34, 36, and 38 as shown, for purposes to be shortly disclosed.

It is to be understood that in some implementations, the invention described below can be enabled or disabled by appropriately setting a binary flag, which might be termed a "use command barrier" flag. If the flag is in one state, flush cache commands are executed in accordance with conventional principles, but flipping the flag enables the present invention to be enabled.

Figure 3:
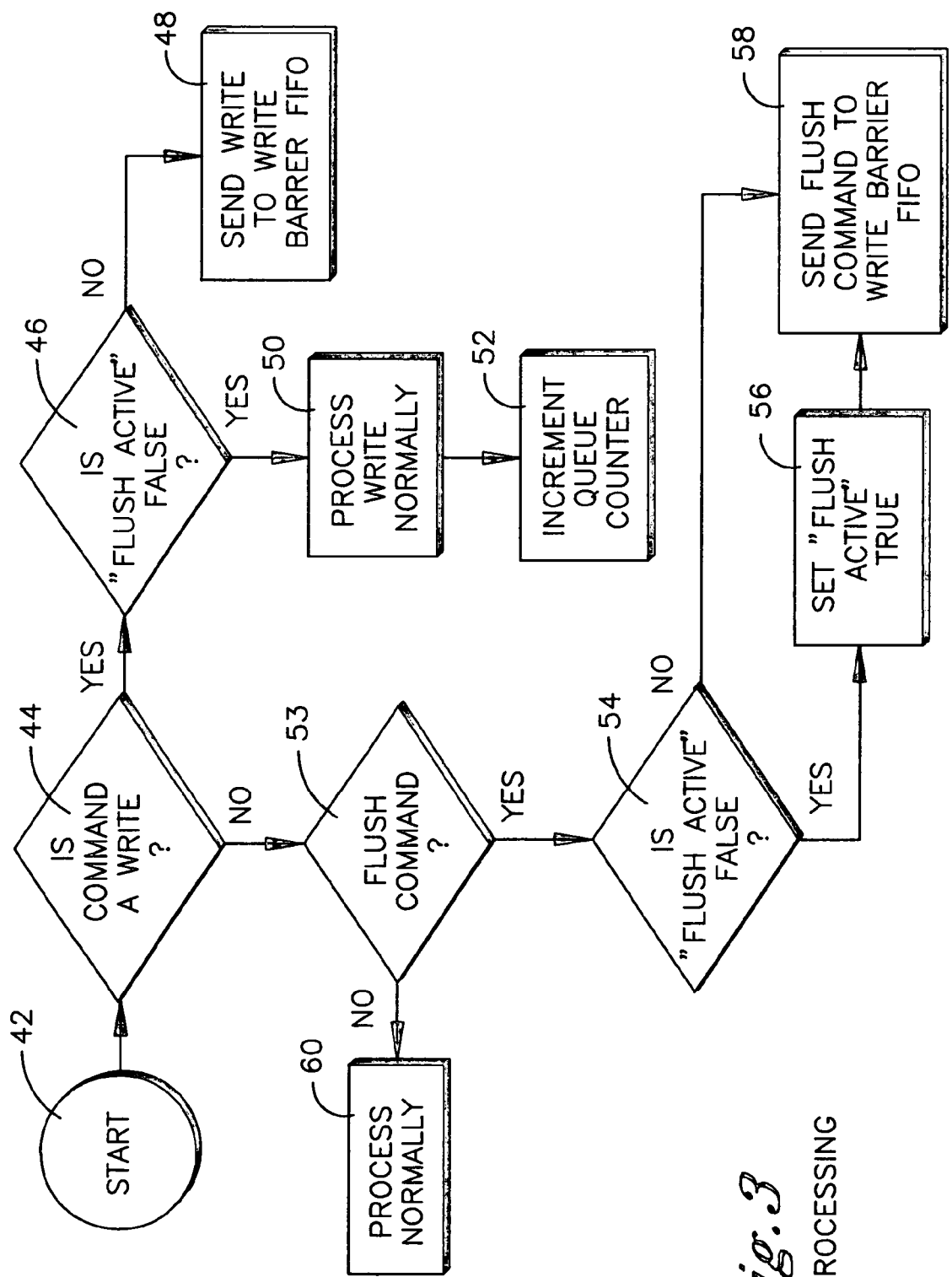
FIG. 3 is non-limiting flow chart showing the preprocessing logic.

Now referring to FIG. 3, one non-limiting implementation of embodying the preprocessing routine summarized above is shown. Commencing at state 42 when a command is received, the preprocessing logic moves to decision diamond 44 to determine whether the command is a write command. More generally, the logic determines whether the command is a non-flush command, it being understood that in some embodiments the present logic may be executed only for non-flush commands that are write commands, to speed processing time.

If the test at decision diamond 44 is positive, the logic flows to decision diamond 46 to determine whether the flush active flag shown in FIG. 2 indicates a false binary state. If not, meaning that flush cache is active, the logic proceeds to block 48 to send the write command to the write barrier FIFO shown in FIG. 2. Otherwise, i.e., if the flush active flag indicates "false", the logic flows to block 50 to process the write command in accordance with conventional cache write command processing. Then, the queue counter shown in FIG. 2 is incremented by one.

In contrast, when it is determined at decision diamond 44 that the command is not a write, the logic moves to decision diamond 53 to determine if the command is a flush. If it is a flush command, the logic flows to decision diamond 54 to determine whether the flush active flag indicates the false state, and if so the flag is flipped to "true" at block 56. The flush command is then sent to the write barrier FIFO at block 58. In contrast, when it is determined at decision diamond 54 that the flush active flag is not "false" the logic flows directly to block 58. Returning to decision diamond 53, as shown when it is determined at decision diamond 53 that the command is not a flush, the command is processed normally at block 60.

Figure 4:
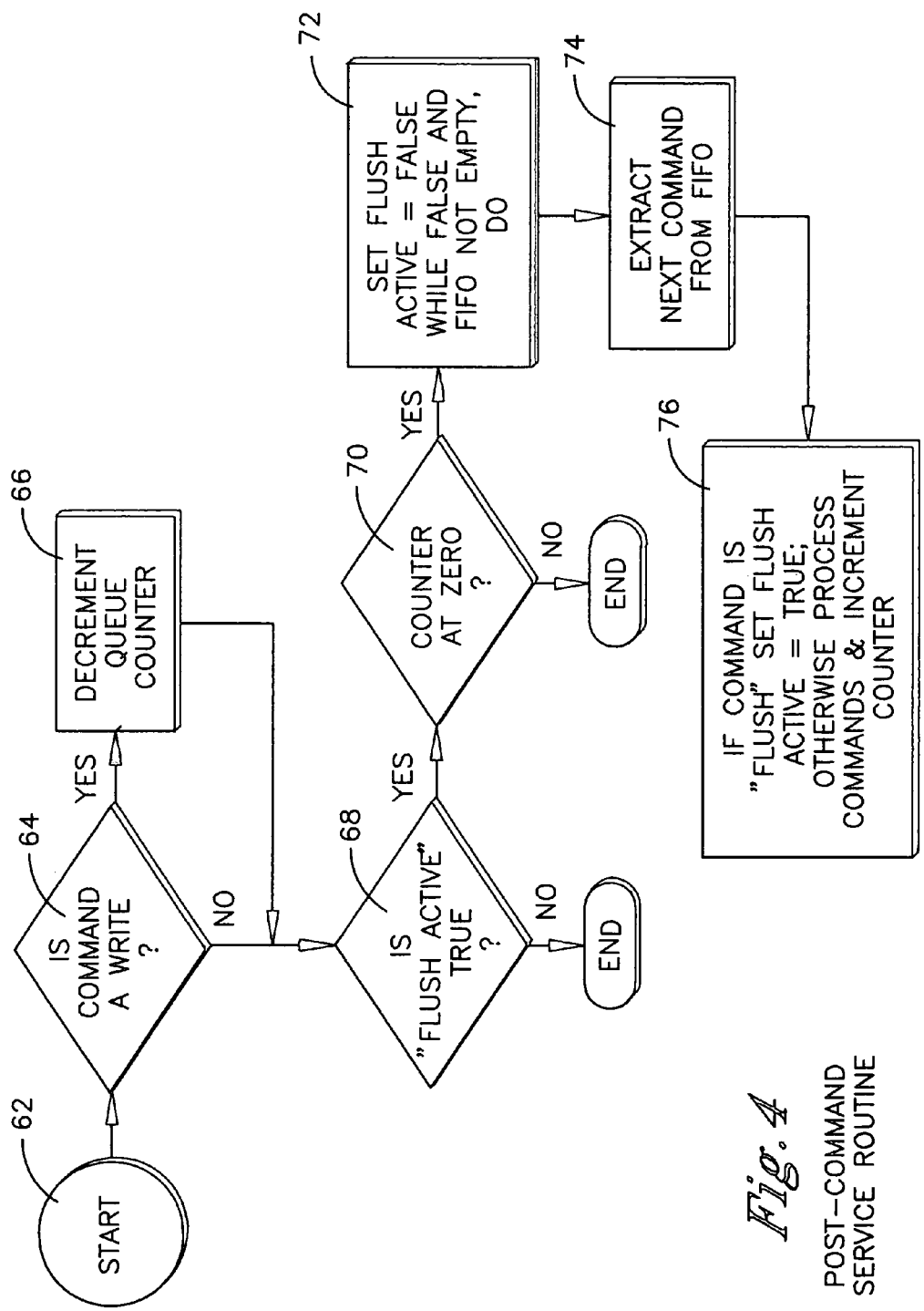
FIG. 4 is non-limiting flow chart showing the post-command service logic.

Now referring to FIG. 4, the post-command service routine logic is shown, commencing at state 62. If at decision diamond 64 it is determined that the command had been a write, the queue counter is decremented by unity at block 66. From block 66 or when the command had been a flush cache command, the logic moves to decision diamond 68 to determine the state of the flush active flag. If the flag is "false" the logic ends, but if it is true it is determined at decision diamond 70 whether the queue counter is at zero. If not, the logic ends, but if the counter is zero the flush active flag is set to "false" at block 72. While the flag is false and the write barrier FIFO is not empty, a DO loop is entered in which the next command from the FIFO is extracted to block 74 and then, at block 76, if the next command is a flush cache command the flush active flag is set to true. Otherwise, if the next command is not a flush cache command, e.g., if it is a write command, the command is processed and the queue counter is incremented by unity.

While the particular TRANSFORMING FLUSH QUEUE COMMAND TO MEMORY BARRIER COMMAND IN DISK DRIVE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for" or, in the case of a method claim, the element is recited as a "step" instead of an "act". Absent express definitions herein, claim terms are to be given all ordinary and accustomed meanings that are not irreconcilable with the present specification and file history.

What is claimed is:

1. A device for storing data, comprising:
 a data storage medium; and
 a controller controlling the medium, the controller executing logic comprising:
 in response to a flush command to flush a command queue, not immediately executing pending commands in the queue and constraining a command reordering algorithm to prevent non-flush commands received after the flush command from being executed prior to commands received before the flush command, wherein the act of not immediately executing pending commands in the queue and constraining a command reordering algorithm is executed only if a flag indicates a first binary state, the flag assuming the first binary state in response to a flush command, the flag assuming a second binary state when a counter is at zero, wherein the logic comprises incrementing the counter in response to receiving at least one non-flush command only while the flag is in the second binary state and decrementing the counter in response to executing at least one non-flush command.

2. The device of claim 1, wherein the non-flush commands are only write commands.

3. The device of claim 1, wherein if the flag is in the first binary state and the counter is at zero, the flag is flipped to the second binary state after servicing a command, and if a barrier register is not empty, a next command is executed from the register, and if the next command is a flush command, the flag is flipped to the first binary state, and otherwise the command is processed and the counter incremented.

4. The device of claim 1, wherein the controller and storage medium are sealed in a housing.

5. The device of claim 4, wherein the device is a hard disk drive and the storage medium is at least one disk.

6. The device of claim 4, wherein the controller is a hard disk drive controller.

7. A computer-implemented method executed by a processor accessing a tangible computer readable memory to cause the processor to execute the method, the method comprising:

in the presence of a flush cache command to flush a cache of a HDD, temporarily delaying execution of non-flush cache commands received after the flush cache command is received until commands awaiting execution in the cache and received prior to the flush cache command have been executed, wherein the act of temporarily delaying is executed only if a flag indicates a first binary state, wherein the flag assumes the first binary state in response to a flush command, wherein the flag assumes the second binary state when a counter is at zero, wherein if the flag is in the first binary state and the counter is at zero, the flag is flipped to the second binary state after servicing a command, and if a barrier register is not empty, a next command is executed from the register, and if the next command is a flush command, the flag is flipped to the first binary state, and otherwise the command is processed and the counter incremented.

8. The method of claim 7, wherein the non-flush commands are only write commands.

9. The method of claim 7, comprising incrementing the counter in response to receiving at least one non-flush command while the flag is in the second binary state and decrementing the counter in response to executing at least one non-flush command.

10. Processor executing logic embodied on a computer readable memory, the logic executed by the processor comprising:

receiving a command;

determining whether the command is a write command;

if the command is a write command, determining whether flush cache is active;

if flush cache is active, sending the write command to a barrier data structure, and if flush cache is not active, processing the write command in accordance with cache command processing and incrementing a queue counter;

if the command is not a write command, determining whether the command is a flush command and if it is, determining whether an indication of flush cache is active and if not, indicating that flush cache is active;

sending the flush command to the barrier data structure; and executing post-command service routine logic including:

in response to determining that a command in the barrier data structure is a write, decrementing the queue counter;

after decrementing the counter or when the command in the barrier data structure is a flush cache command, determining whether flush cache is active;

only if flush cache is active, determining whether the queue counter is at zero and only if it is setting flush cache to inactive;

while flush cache is inactive and the barrier data structure is not empty, executing a DO loop in which a next command from the barrier data structure is extracted and if the next command is a flush cache command, indicating that flush cache is active flag and otherwise, if the next command is not a flush cache command, processing the command and incrementing the queue counter.

* * * * *